United States Patent
Mangelsdorf

(10) Patent No.: US 6,671,664 B1
(45) Date of Patent: Dec. 30, 2003

(54) MANAGEMENT OF UNCOMMITTED REGISTER VALUES DURING RANDOM PROGRAM GENERATION

(75) Inventor: Steven T. Mangelsdorf, Fort Collins, CO (US)

(73) Assignee: Hewlett-Packard Development Copany, L.P., Houston, TX (US)

( * ) Notice: Subject to any disclaimer, the term of this patent is extended or adjusted under 35 U.S.C. 154(b) by 0 days.

(21) Appl. No.: 09/510,371

(22) Filed: Feb. 22, 2000

(51) Int. Cl.[7] .............................................. G06F 9/455
(52) U.S. Cl. ........................ 703/26; 703/22; 712/216; 712/242; 714/39
(58) Field of Search .............................. 703/14, 16, 22, 703/24, 26; 712/216, 218, 227, 217, 242; 714/39

(56) References Cited

U.S. PATENT DOCUMENTS

| | | | | |
|---|---|---|---|---|
| 5,748,936 A | * | 5/1998 | Karp et al. ................. 395/394 |
| 5,881,280 A | * | 3/1999 | Gupta et al. ................. 395/591 |
| 5,926,832 A | * | 7/1999 | Wing et al. .................. 711/141 |
| 6,011,908 A | * | 1/2000 | Wing et al. ............. 395/182.17 |
| 6,031,992 A | * | 2/2000 | Cmelik et al. .............. 395/705 |

* cited by examiner

Primary Examiner—Samuel Broda
Assistant Examiner—T. Phan

(57) ABSTRACT

A method and an apparatus make available uncommitted register values during the random code generation process. When there is a need for a register to contain a specific (desirable) value, then the register value is committed to that value at that point. Uncommitted values can propagate through one or more previous instructions. All registers and memory begin the test program in the uncommitted state. When the random code generators is done generating the test program, if any uncommitted values remain, then the uncommitted values are committed to arbitrary values.

12 Claims, 16 Drawing Sheets

MANAGEMENT OF UNCOMMITTED REGISTER VALUES DURING RANDOM PROGRAM GENERATION

TECHNICAL FIELD

The technical field is design verification of central processing units that execute programs according to Instruction Set Architectures.

BACKGROUND

Instruction set architectures (ISA) specify how central processing units (CPU) execute programs. The programs include instructions stored in memory. Instructions are typically simple, primitive operations such as add, branch on condition, load from memory, and store to memory.

To provide for software compatibility with legacy computer systems, modem CPUs should adhere to the ISA with minimal defects. To achieve this goal, computer designers could verify the correct behavior of each kind of instruction in isolation. However, this may not be sufficient because, in an effort to improve performance, modem CPUs may overlap the execution of numerous instructions. In this environment, some defects may be exposed only when specific combinations of instructions are executed in sequence. Thus, the designer may desire to test every combination or sequence of instructions. However, modem CPUs typically execute over 100 instructions, each of which can include numerous options. Mechanically enumerating all of these possible instructions sequences may not feasible. Even if all possible instruction sequences were enumerated, the designer's test regime may be insufficient because many defects require more than just a specific sequence of instructions. In particular, additional events, such as operand data patterns, memory address collisions between instructions, the state of CPU structures such as cache memories, and stimulus received by the CPU can pre condition defects.

One of the most important tools used by a CPU designer to address these challenges is a Random Code Generator (RCG). The RCG creates a random software program that is used during the CPU design and prototype verification process to generate billions of random instructions to test the CPU.

The RCG creates the initial state of the CPU for each random software program. The initial state includes instructions in memory, and data used by these instructions. The data can be located in memory or CPU structures like registers and caches. An expected final state is also required to check the actual final state created by running the random program on the CPU. The expected final state can be created by the RCG. Alternatively, the expected final state can be obtained by running the random software program on a separate CPU reference emulator.

The RCG maintains two models of the state of the CPU registers: the initial state and the current state. The CPU registers and memory are collectively referred to as data locations. In operation, a typical RCG operation creates random values for all data locations and stores them in the initial and current states. The RCG then loops until a desired program length is achieved. A typical random software program length may be 100 instructions or more. A program counter is used to track the instructions in the random software program. If the program counter points to an uninitialized instruction memory, the RCG generates a random instruction and stores the initial and current states. Next, the instruction pointed to by the program counter is emulated, updating the current state. The program counters then increments and the next instruction is examined.

This method may work in some cases, but is often insufficient for generating high quality random software programs in many other cases. Examples of these cases include: 1) when it is desirable for addresses used by load/store instructions to contend for the same cache locations; 2) when it is desirable to avoid instruction operands that result in an excessive number of traps; 3) when it is desirable to select branch target addresses that cause different parts of the program to contend for the same cache locations; and 4) when it is desirable to avoid instruction operands that the ISA specifies are illegal or that may cause unpredictable results.

In current systems, the RCG can set aside a sub set of the registers for specific use such as memory addressing for load and store instructions. Instead of being given random values, these registers can be given desirable values. But these registers cannot be changed by the random software program because they would be overwritten with random values. This makes it impossible for the random software program to test use of these registers after an earlier modification of the registers. This situation provides unacceptable coverage holes.

In other current systems, when the RCG first selects the operands registers for an instruction, and those registers hold values that are undesirable, the RCG may repeat the selection one or more times until more suitable registers are found. The problem is that the requirements for a register value to be desirable are often very specific. Further, no desirable registers may be available. If a desirable register is available, this approach would tend to select the desirable register a disproportionate number of times, thereby reducing the quality of the test coverage.

SUMMARY

A method and an apparatus make available uncommitted register values during the random code generation process. When there is a need for a register to contain a specific (desirable) value, then the register value is committed to that value at that point. Uncommitted values can propagate through one or more previous instructions. All registers and memory begin the test program in the uncommitted state. When the random code generators is done generating the test program, if any uncommitted values remain, then the uncommitted values are committed to arbitrary values.

As an example, if a random code generator is in the process of generating instruction 2:

1. r1=r2+3
2. Load memory at r1 into r3:

The values r1 and r2 are uncommitted. The RCG desires to commit r1 to a specific desirable value 1024. The RCG can do this, but this has implications for r2, since r1=r2+3. The RCG must also therefore commit r2 to 1021.

In an embodiment, the RCG generates random programs by determining a plurality of data locations, with each of the data locations given an unassigned initial content, assigning an initial content to one or more data locations of the plurality of data locations, the assignment occurring exactly once during a random program generation, processing a plurality of instructions, one instruction at a time, in a program execution order, until a desired random program length is achieved, with the processing providing the data locations with current values. The processing includes computing a current content of each of the plurality of data locations, the current content depends on functions of previously processed instructions, and wherein the current content may be unknown when the current content depends on an unassigned initial content of one or more data locations. The processing continues with generation of a random instruction, and, if a current content of a data location consumed by the random instruction depends on an unassigned initial content of at least one data location, the initial content is assigned to the at least one data location that optimizes an effectiveness of the random instruction. Finally, an instruction opcode is assigned to an initial content of a data location pointed to by a program counter, and a program counter is advanced.

DESCRIPTION OF THE DRAWINGS

The detailed description will refer to the following figures, in which like numerals refer to like elements, and in which.

DETAILED DESCRIPTION

Central processing units (CPU) have instruction set architecture (ISA) that specify how the CPU executes programs. The programs include instructions stored in memory. Instructions are typically simple, primitive operations such as add, branch on condition, load for memory, and stored to memory.

During development of such a CPU, the designer must verify that the design complies with the ISA. This present difficulties because modem CPUs may attempt to overlap the execution of numerous instructions to improve performance. Because of this design option, some defects will only be exposed when specific combinations of instructions are executed in sequence. There are typically over 100 instructions, each of which can include numerous options. Therefore, mechanically enumerating all possible instructions sequences is not feasible. Even this would be insufficient because many defects require more than just a specific sequence of instructions. Operand data patterns, memory address collisions between instructions, the state of CPU structures such as cache memories, and stimulus received by the CPU on its external surfaces are examples of additional events that can pre condition defects.

A Random Code Generator (RCG) can be used to implement a testing program in these modern CPUs. The RCG essentially creates a random software program. RCGs are used during the design and prototype verification process to generate billions of random instructions to test the CPU.

The RCG creates an initial state of the CPU for each random program. The initial state includes instructions in memory and data used by these instructions. The data can be located in memory or CPU locations like registers and caches. An expected final state is also required to check the actual final state created by running the random program on the CPU. This can be created by the RCG, or the final state can be obtained by running the random program on a separate CPU reference emulator.

Figure 1:
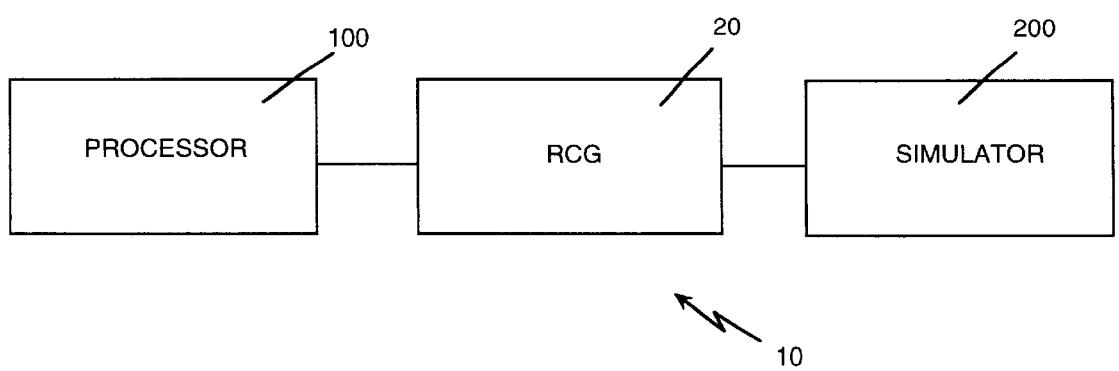
FIG. 1 is a block diagram of a testing environment using a random code generator.

FIG. 1 is a block diagram of a test environment 10 that uses a random code generator (RCG) 20 to perform specific tests. The environment 10 includes a hardware device, or processor, 100. The environment 10 also includes a simulator 200 that simulates all or part of the processor 100. The RCG 20 is coupled to the processor 100 and the simulator 200, and may be used to perform tests on either device.

The functions of the RCG 20 may be separated into two or more components. For example, a RCG could be used to generate the random software program, and a separate emulator could be used to determine the correct final state of the data locations after execution of the random software program.

Figure 2:
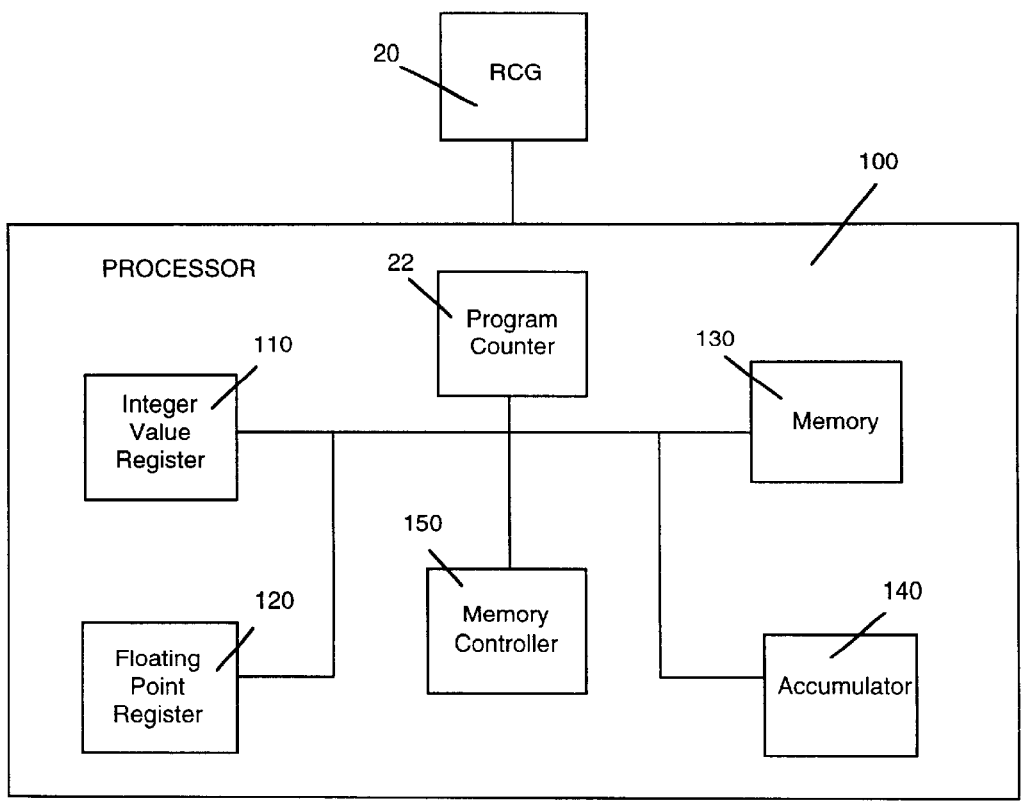
FIG. 2 is a more detailed block diagram of the environment of FIG. 1.

FIG. 2 is a more detailed block diagram of the test environment 10 shown in FIG. 1. In FIG. 2, the processor 100 is shown in more detail. The simulator 200 may include modules or components that simulate one or all of the components (and their functions) of the processor 100. Accordingly, a detailed block diagram of the simulator is not needed, and one of ordinary skill in the art would understand how to construct such a simulator.

The processor 100 is shown coupled to the RCG 20. The processor 100 includes a memory subsystem 130, one or more integer value registers 110, one or more floating point registers 120, and one or more accumulators 140. Also included is a memory controller 150. The registers, memory and accumulators will be referred to hereafter as data locations. Other devices besides the integer value registers 110, the floating point registers, accumulators and memory may also be included in the processor 100 as data locations.

The RCG 20 generates an initial state of the processor 100. The initial state includes all registers, accumulators, memory and other components that are used in execution of the random software program. These registers, accumulators and memory are referred to as data locations. The RCG 20 will generate random values for selected data locations. That is, the RCG 20 will generate random values for every data location the test sequence will actually use. The RCG 20 may generate the random values using mathematical routines that are well known in the art. As the RCG 20 generates the random instructions in the instruction sequence, the RCG 20 may emulate the random instruction. As the instruction sequence executes, the RCG 20 will update values in the data locations and will provided a current state of the processor 100. When the instruction sequence executes, the current state of the hardware device will deviate from the initial state.

Also included in the hardware device is a program counter 22. The program counter 22 is used to point to data locations, including data locations that are uninitialized. If the data location that the program counter 22 points to is uninitialized, the RCG 20 may write a value to that data location. Otherwise, the RCG 20 cannot change that data location. In this case, the RCG 20, rather than generating a new instruction, continues processing with the instruction provided at that data location. Whether the RCG 20 generates a new instruction or uses an existing instruction in a data location, the RCG 20 advances the state of the processor 100 according to the action of the instruction. The program counter 22 then points to a next data location, and the process continues.

Figure 3:
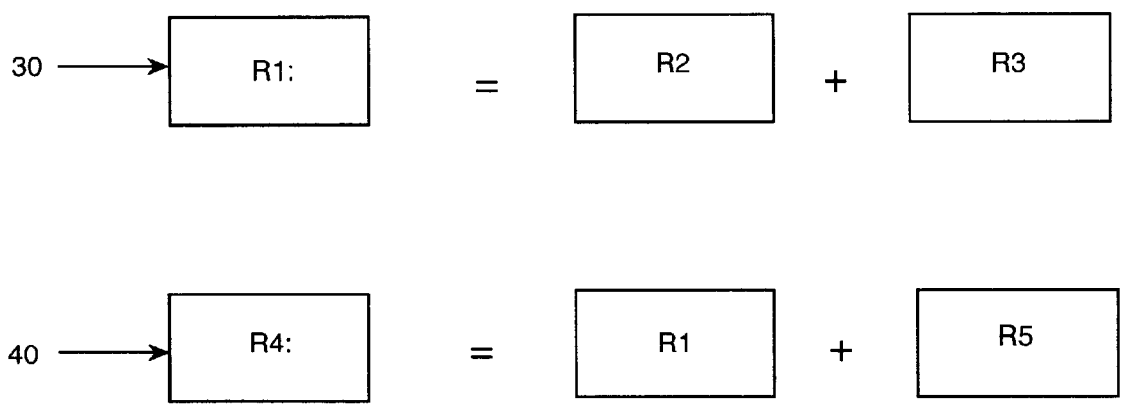
FIG. 3 is an example of a random code sequence.

FIG. 3 shows an example of a code sequence generated by the random code generator. In FIG. 3, a first instruction 30 determines a value r1=r2+r3. A second instruction 40 determines a value r4=r1+r5.

Figure 4:
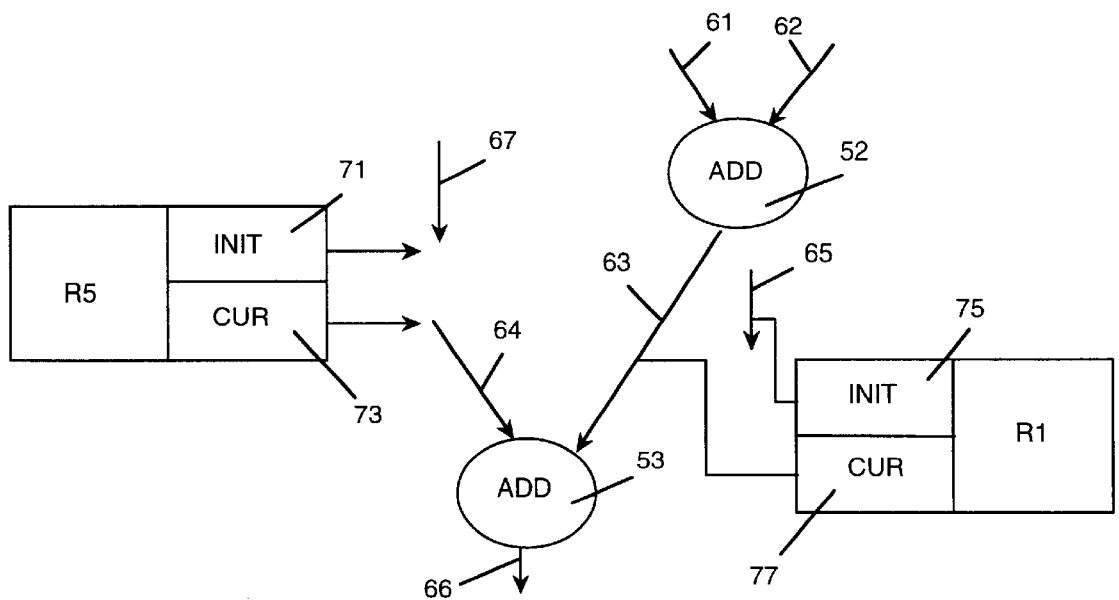
FIG. 4 illustrates a graph data structure used to generate random programs in the presence of uncommitted values.

FIG. 4 shows a graph data structure 50 used to generate random programs in the presence of uncommitted values. The graph 50 is a logical representation of a data structure in the RCG 20. The graph 50 includes nodes 52 and 53 that correspond to instructions processed so far. Edges 61–67 of the graph 50 correspond to operand values. For example, the node 52 is an ADD instruction that receives two inputs 61 and 62 and produces a single output value 63. For data location defined by the ISA, two pointers are maintained, the first pointer points to a value that is held initially, and a second pointer points to a value that the data location holds currently. In the example illustrated in FIG. 4, the pointers 71 and 73 correspond to an initial and a current state for the register R5. Pointers 75 and 77 correspond to an initial and a current state for the register R1.

Using the code sequence illustrated in FIG. 3, the current state 77 of the register R1 is updated by the ADD instruction that adds values from registers R2 and R3 to produce an the output 63. The current value 73 of the register R5 is then added to the current value of the register R1 to produce the output 66.

The values shown in FIG. 4 as edges can each have one of three states. A value can be uncommitted if it can hold any number. The value is deferred if the value can no longer hold any number but its number is not yet known. Finally, the value can be committed if it holds a specific number.

In an embodiment, the RCG 20 makes available uncommitted data locations during the random program generation process. When a need exists for a data location to contain a specific (desirable) number, then the value in the data location is committed to that desirable number at that point in the execution of the random program. Uncommited values can propagate through one or more previous instructions. All data locations begin the random program in the uncommitted state. This initial state remains fixed, but a current state for each data location is updated as the random program is executed. When the RCG 20 has completed generating the random program, if any uncommitted data locations remain, the uncommitted data locations are committed to arbitrary numbers.

Figure 5A:
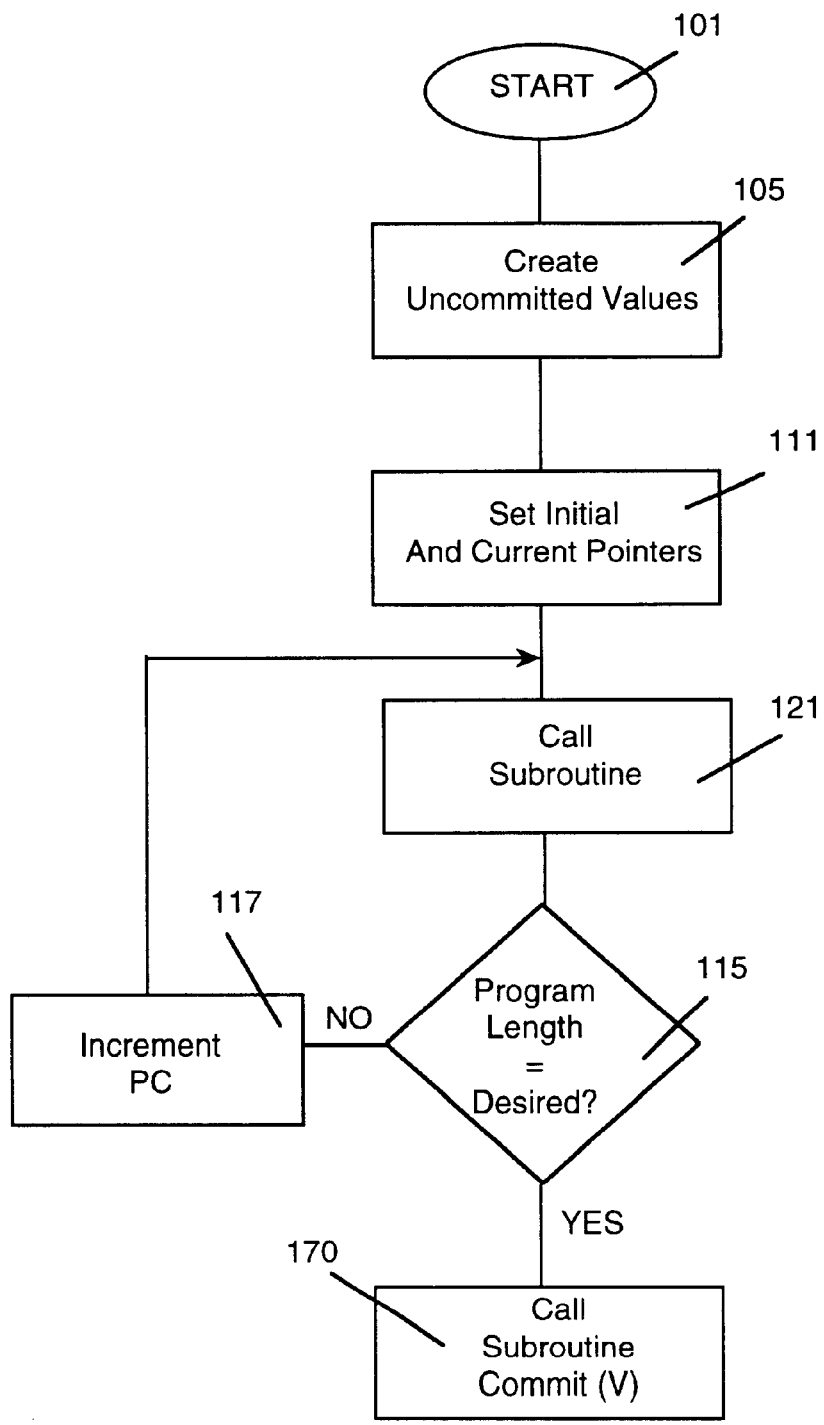
FIGS. 5a–11c are flowcharts illustrating operation of the random code generator.

The process is illustrated with reference to FIGS. 5a–12c. FIG. 5a is a flowchart illustrating a high level algorithm executed by the RCG 20. The process starts in block 101. The RCG 20 then creates an uncommitted value for all data locations, block 105. Next, the initial state pointer and the current state pointer are set to the uncommitted value for all data locations, block 111. The RCG 20 then executes subroutine 121. Following subroutine 121, the program length is then checked by the RCG 20 to determine if the desired program length has been achieved, block 115. If the desired program length has not been achieved, the program counter 22 is incremented, block 117 and then the process returns to block 121. Once the desired program length has been achieved, the RCG 20 calls the commit (value V) subroutine 170 for each data location to commit the value pointed to by the current state pointer.

Figure 5B:
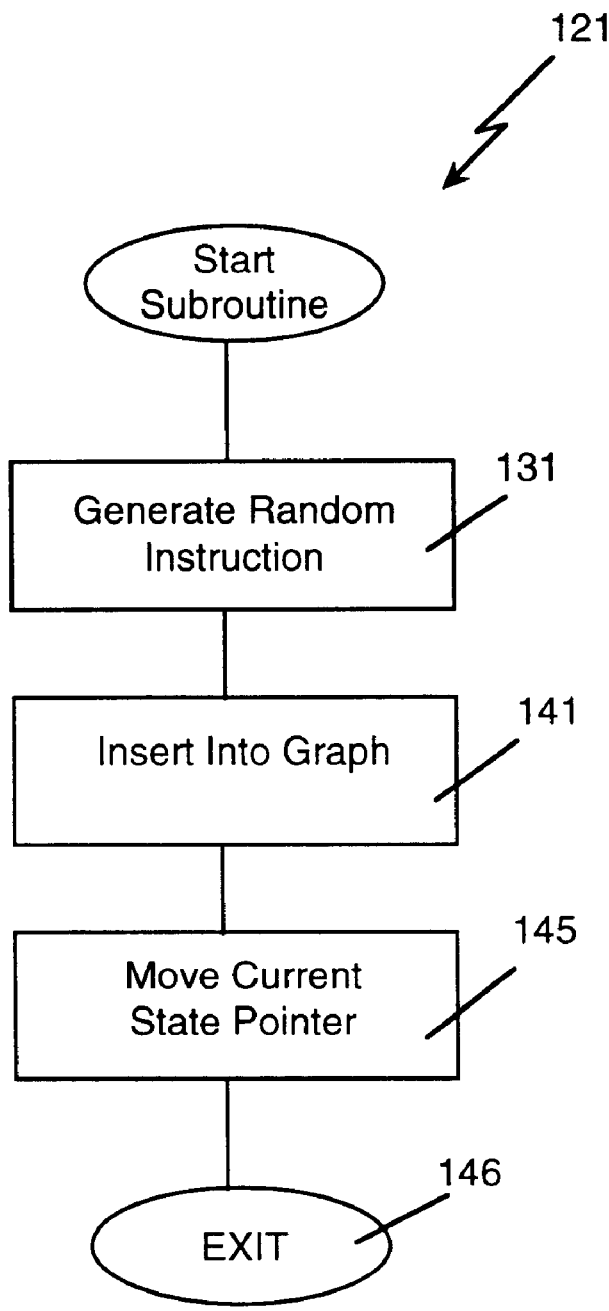

FIG. 5b is a flowchart illustrating a subroutine 121 for execution when the program counter 22 points to an uninitialized instruction memory. The RCG 20 generates a random instruction and stores in the initial and current state values for that data location, block 131. The RCG 20 then inserts the instruction into the graph, block 141. For the destination data location of the instruction, the RCG 20 moves the current state pointer to point to the output value of the instruction, block 145. The subroutine then ends, block 146.

Figure 6:
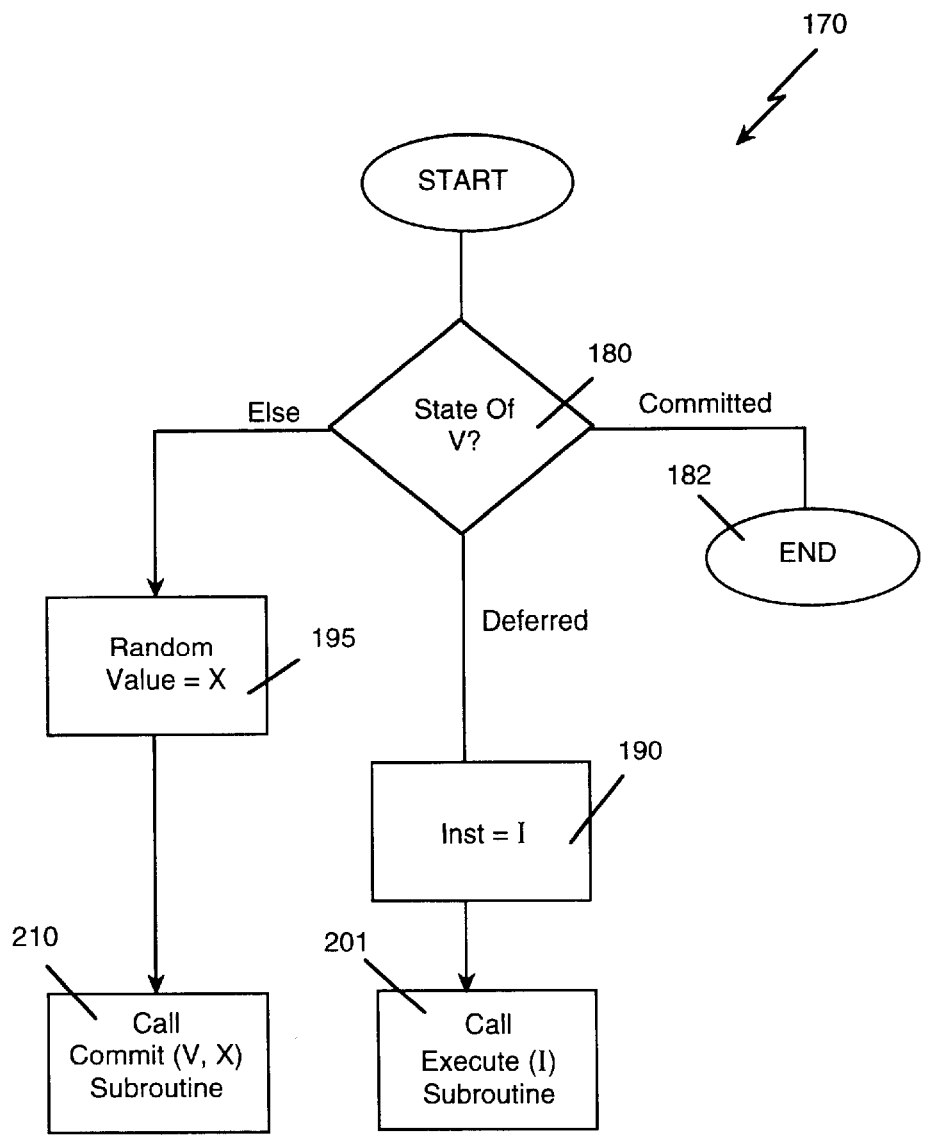

FIG. 6 is a flowchart illustrating the commit (value V) subroutine 170. The RCG 20 determines a state of the value V, block 180. If V is committed, the process moves to block 182 and ends. If V is deferred, the RCG 20 determines the instruction that produced V, block 190. The RCG 20 then calls execute (I) subroutine 201. If V is neither committed nor deferred, the RCG 20 generates a random number X, block 195. The RCG 20 then calls commit (V,X) subroutine 210.

Figure 7:
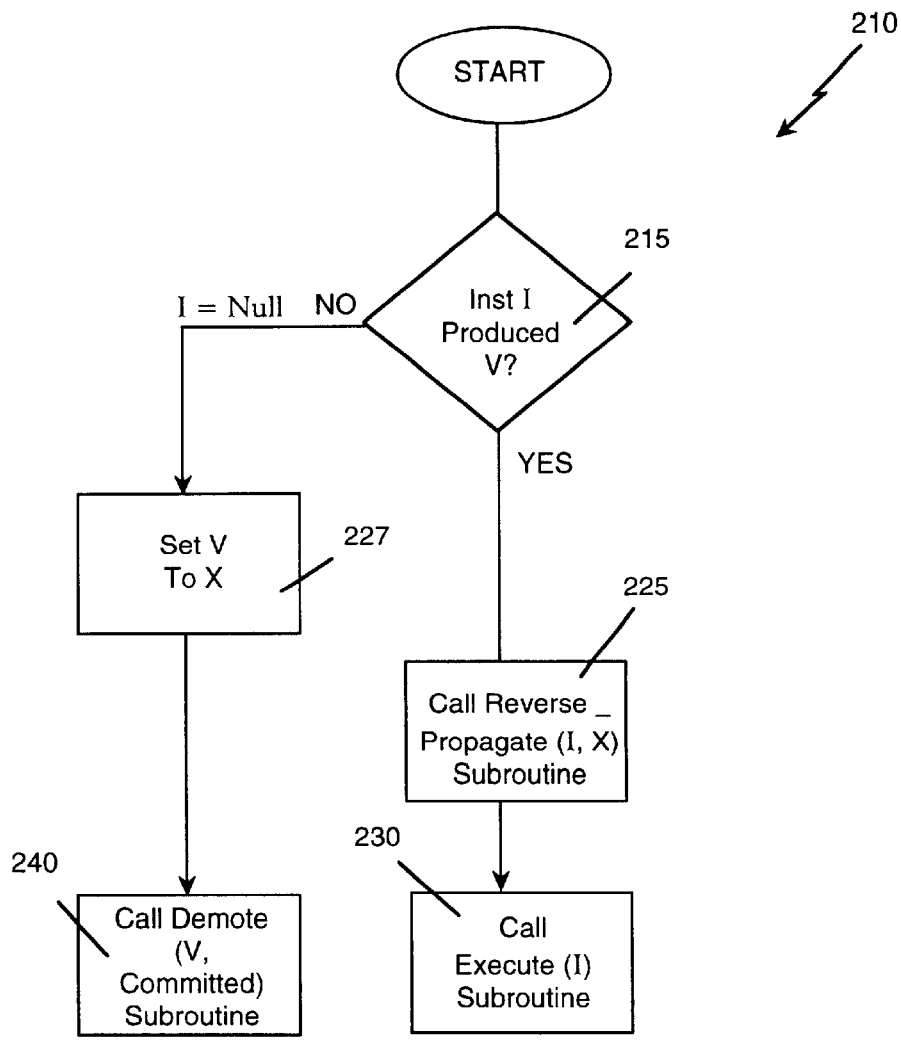

FIG. 7 is a flowchart illustrating the commit (V,X) subroutine 210. The RCG 20 determines if an instruction I produced the value V, block 215. If I exists, then the RCG 20 calls subroutine reverse_propagate (I,X) 225 and then calls subroutine execute (I) 230. If no instruction I produced the value V (I=NULL), the RCG 20 sets the value of V to X, block 227. The RCG 20 then calls subroutine demote (V, committed) 240.

Figure 8:
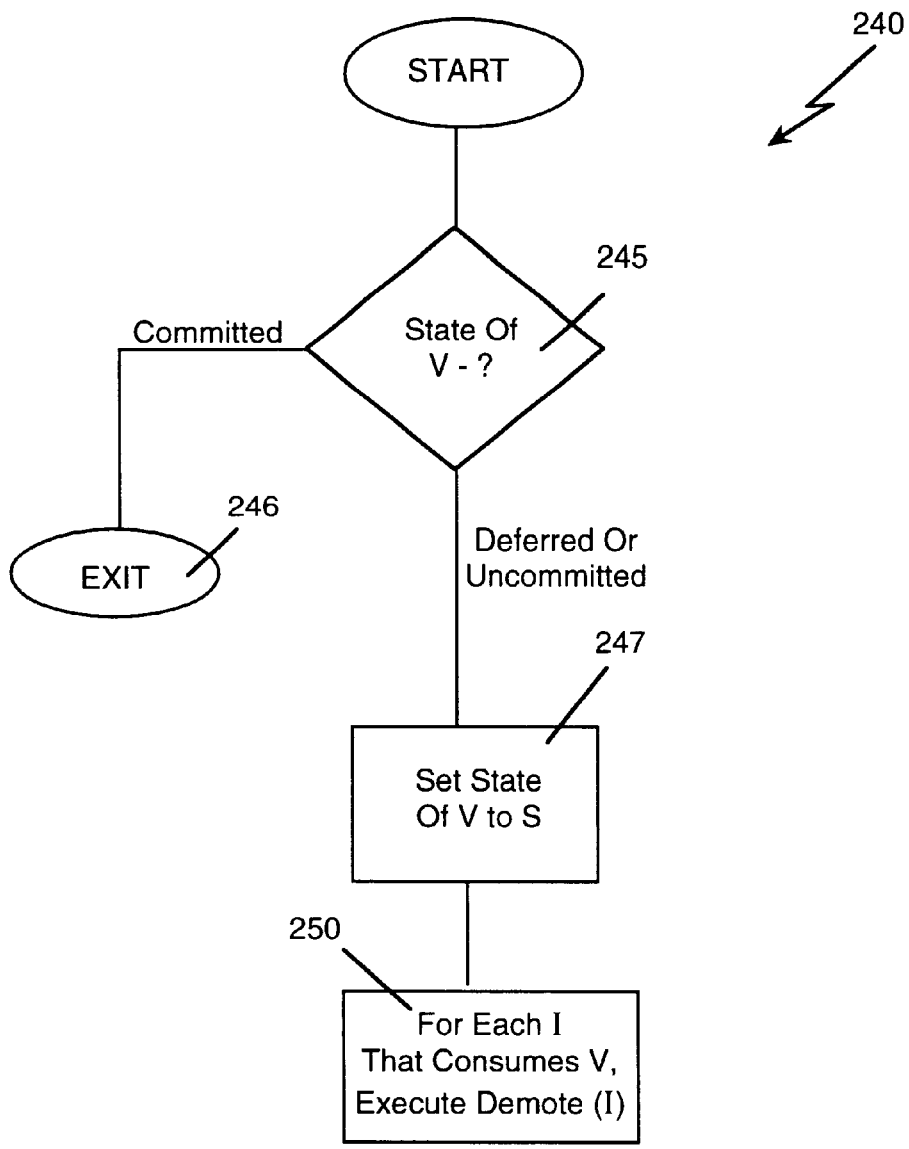

FIG. 8 is a flowchart illustrating the subroutine demote (value V, state S) 240. In block 245, the RCG 20 checks if the state of V is committed. If the state of V is uncommitted or deferred, the RCG 20 sets the state of V to S, block 247. Then, for each instruction I that consumes V, the RCG 20 calls subroutine demote (I) 250. If the state of V was committed, the subroutine exits, block 246.

Figure 9:
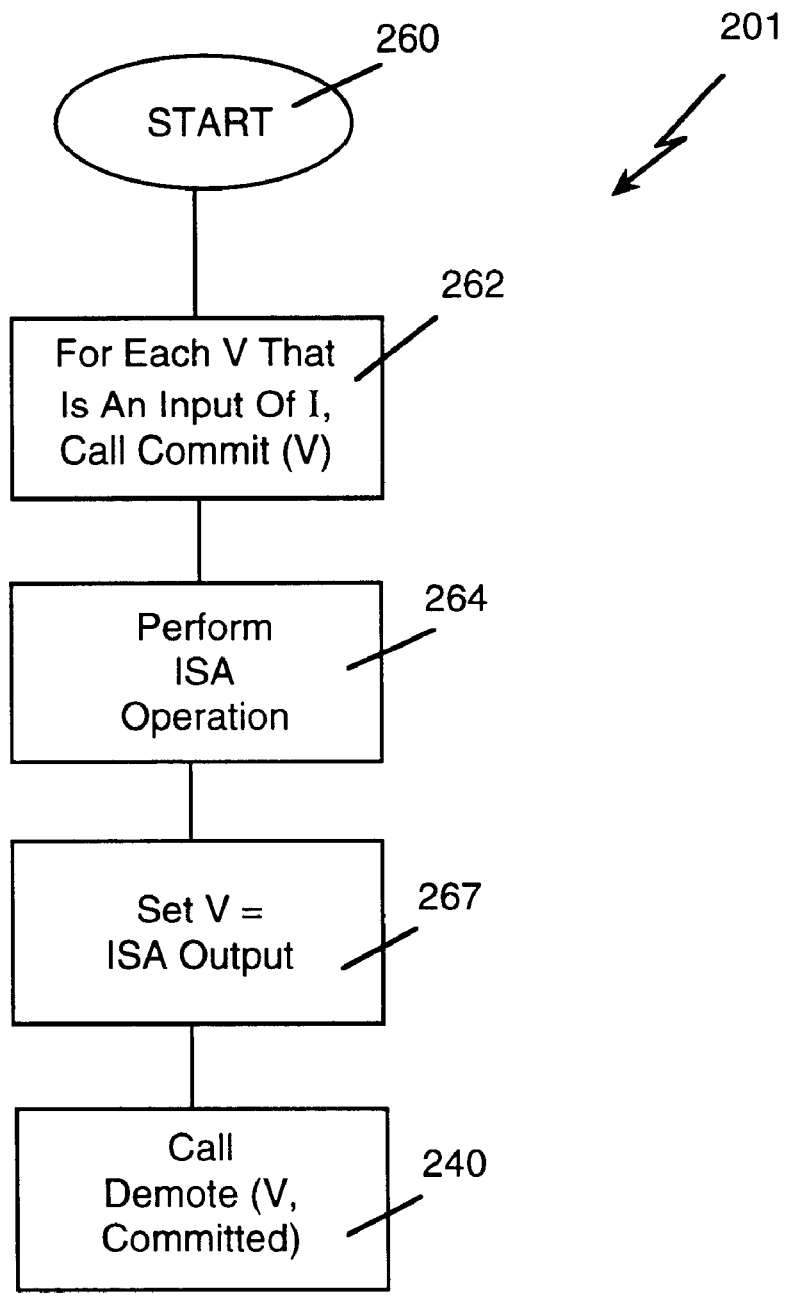

FIG. 9 is a flowchart illustrating the execute (instruction I) subroutine 201. The RCG 20 calls the commit (V) subroutine 170 for each input value of I, block 260. Next, the RCG 20 performs an ISA operation for I, block 265. For each output value V of I, the RCG 20 sets the value of V to the result of the ISA operation of I, block 267. The RCG 20 then calls the demote (V, committed) subroutine 240.

Figure 10:
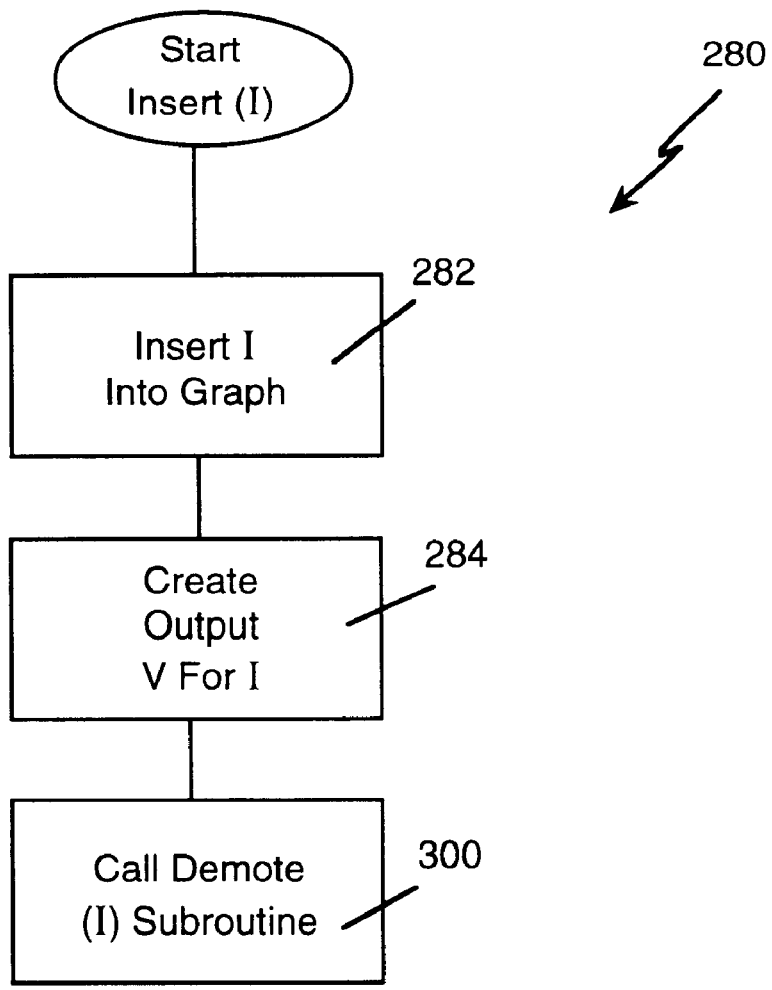

FIG. 10 is a flowchart illustrating an insert (instruction I) subroutine 280. For instruction I, the RCG 20 inserts the instruction into the graph 50, block 282. The RCG 20 uses the current state pointers for data locations consumed by I to determine which values I is attached to. The RCG 20 then creates a value V for the result of the instruction I, block 284. The initial state of the value V is uncommitted. The RCG 20 then executes the subroutine demote (I), block 300.

Figure 11A:
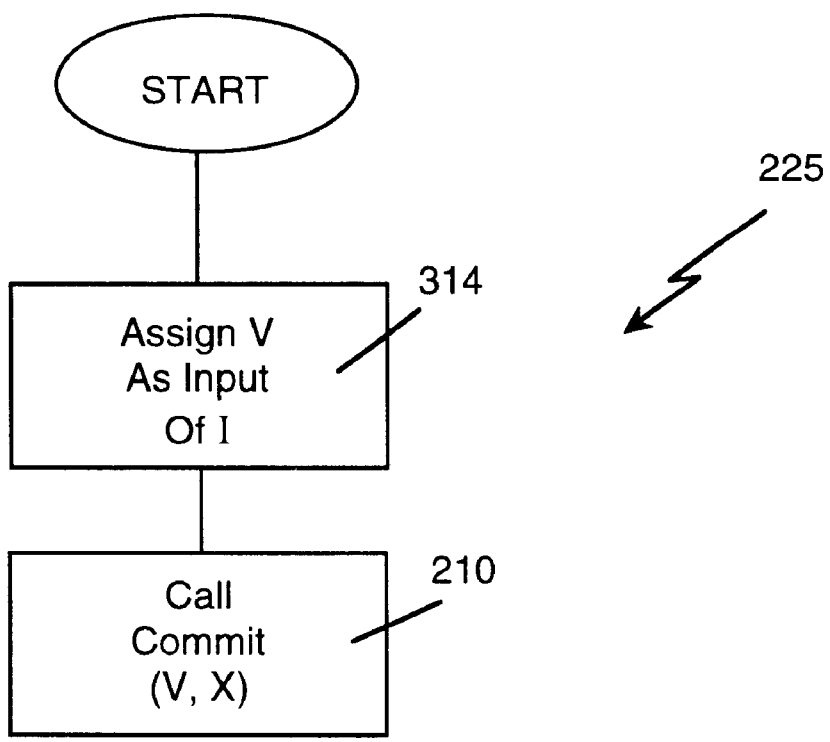
Figure 11B:
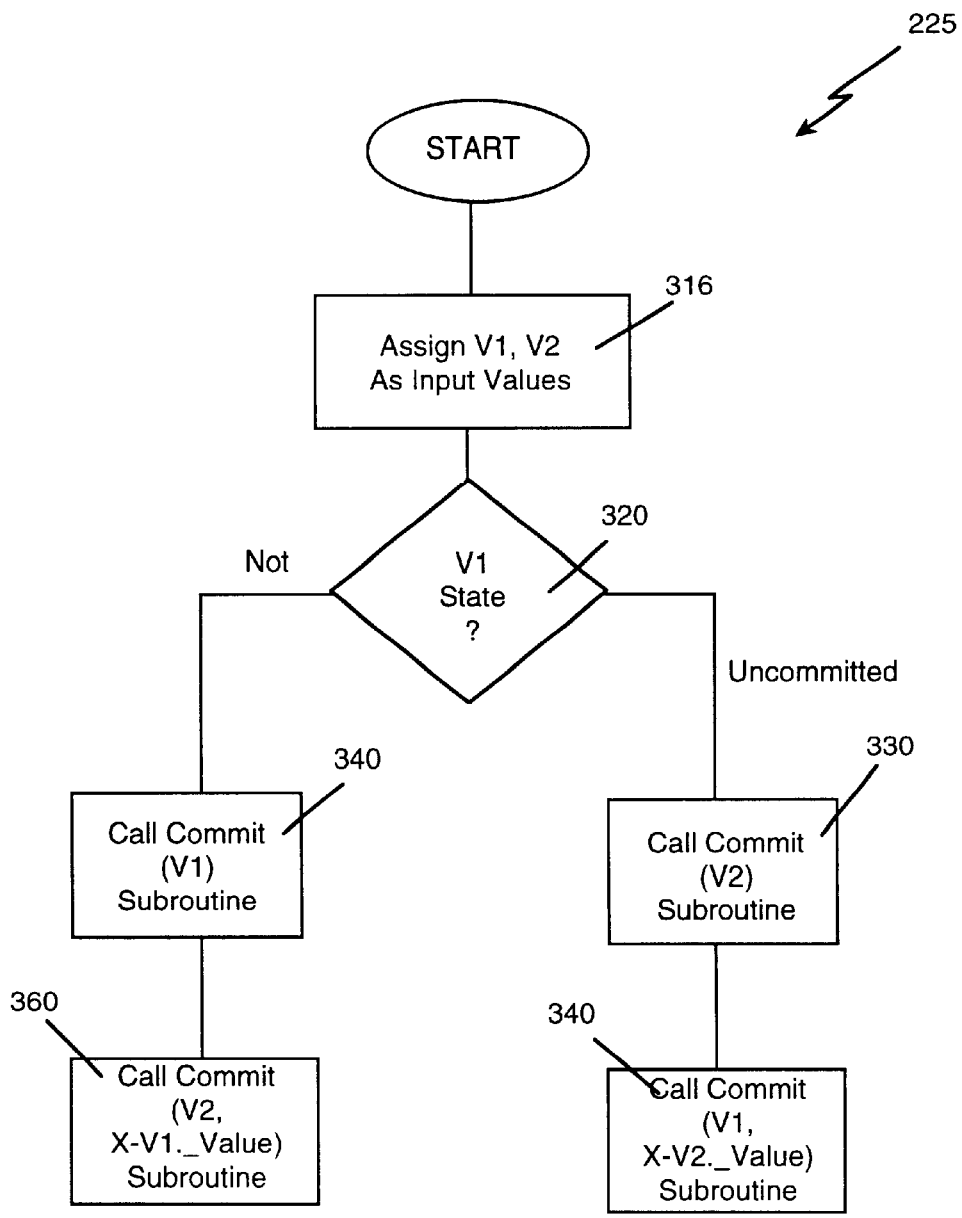

FIGS. 11a and 11b are flowcharts illustrating the subroutine reverse_propagate (instruction I, integer X) 225. The reverse_propagate subroutine is called for instruction types that can propagate uncommitted values. The reverse_ propagate subroutine commits one or more input values of instruction I to values that will result in X being produced for the output of the instruction I when the subroutine execute (I) is called. FIG. 11a is a flowchart illustrating the subroutine reverse_propagate (I,X) 225 when the instruction I is a COPY instruction. The RCG 20 assigns V as an input value of I, block 314. The RCG 20 then calls the subroutine commit (V,X) 210, described above.

FIG. 11b is a flowchart illustrating the subroutine reverse_propagate (I,X) 225 when the instruction I is an ADD instruction. The RCG 20 assigns V1 and V2 as input values for the instruction I, block 316. In block 320, the RCG 20 determines if V1 is uncommitted. If V1 is uncommitted, the RCG 20 calls subroutine commit (V2) 170, block 330. The RCG 20 then calls the subroutine commit (V1,X−V2._value) 210, block 340. If the value of Vi is not uncommitted, then the RCG calls the subroutine commit (V1) 170, block 350 and the subroutine commit (V2,X−V1._value), block 360.

Figure 12A:
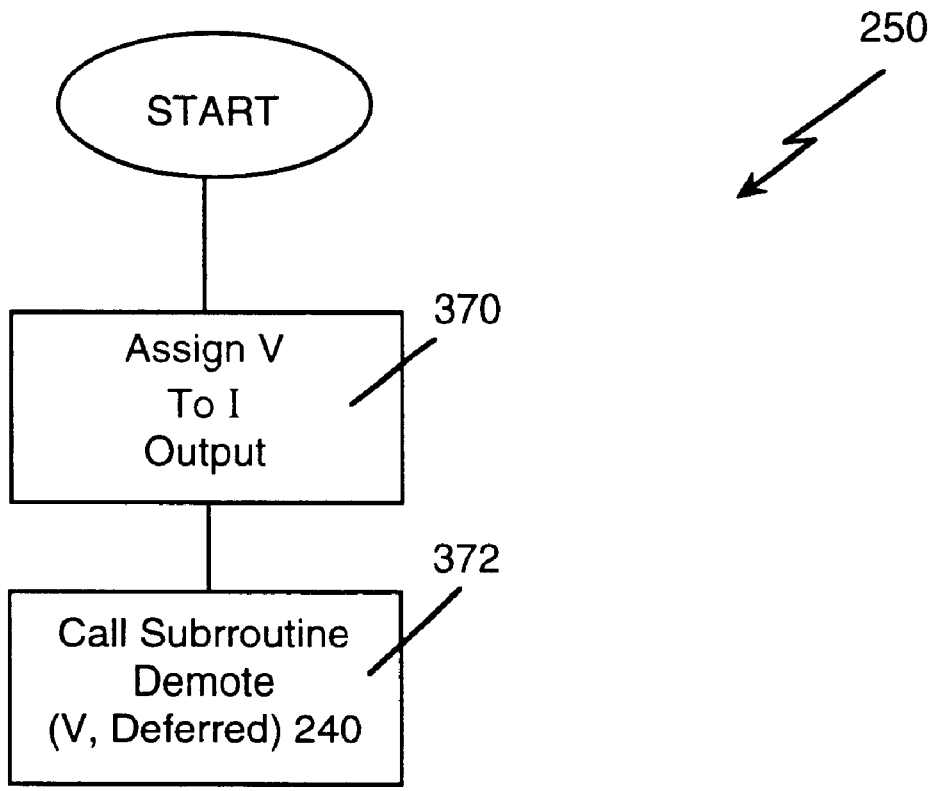
FIGS. 12a–12c are flowcharts illustrating the subroutine demote (Instruction I) 250.
Figure 12B:
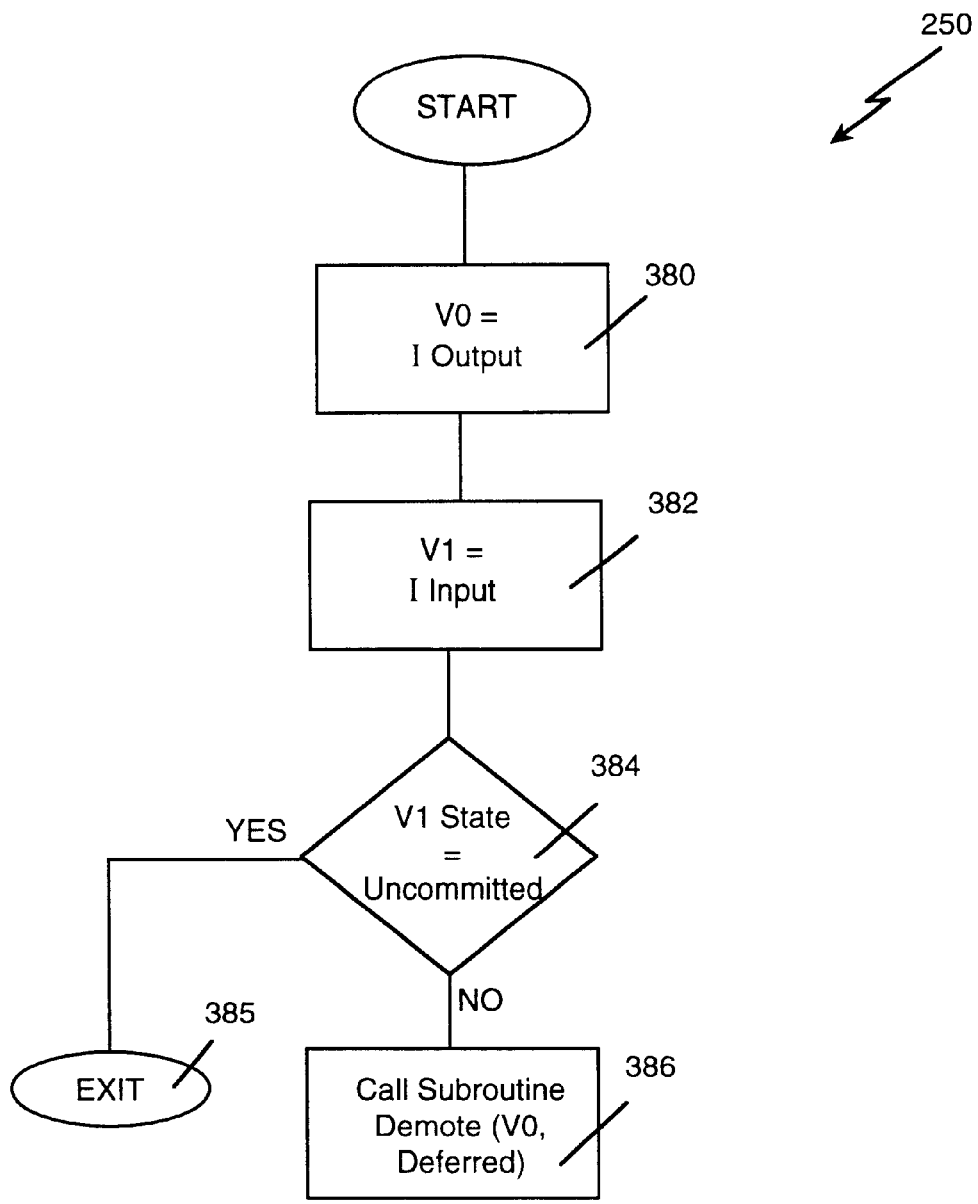
Figure 12C:
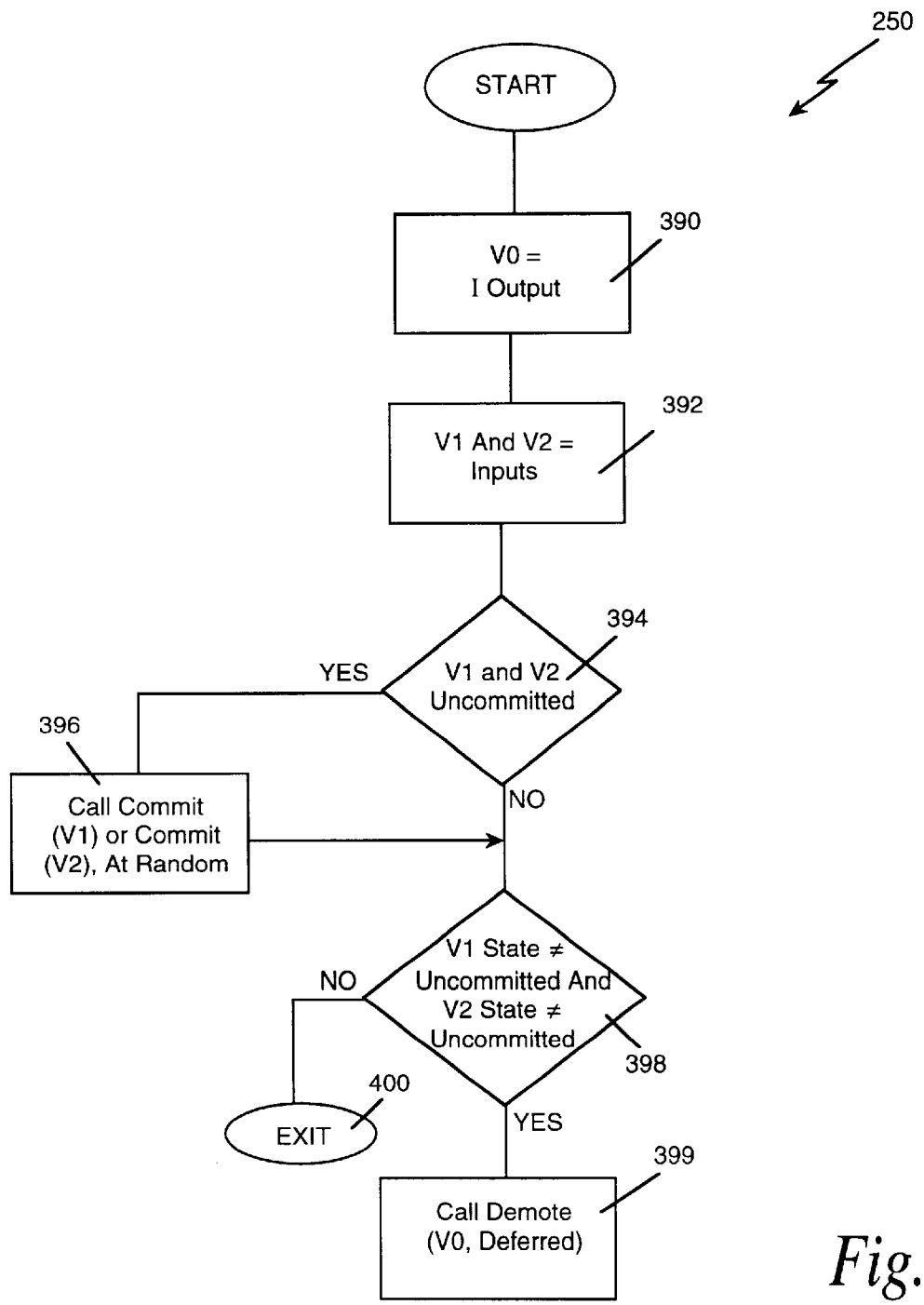

FIGS. 12a–12c are flowcharts illustrating the subroutine demote (instruction I) 250. The subroutine demote (instruction I) 250 is intended to demote the state of the output values of the instruction I depending on the capability of the instruction I to propagate uncommitted values. The definition of the subroutine demote (instruction I) 250 is differs with each instruction type. FIG. 12a is a flowchart illustrating the subroutine demote (instruction I) 250 for instructions types that are not capable of propagating uncommitted values. Such instructions include DIVIDE, floating point instructions and Boolean instructions, for example. The RCG 20 assigns V to the output value of the instruction I, block 370. The RCG 20 then calls the subroutine demote (V, deferred) 240, block 372.

FIGS. 12b and 12c are flowcharts illustrating illustrating the subroutine demote (instruction I) 250 for COPY and ADD instructions.

Using the above-described processes, the RCG 20 can choose a data location with an uncommitted state as an operand of an instruction. The RCG 20 can then provide any desired content or value for entry into that data location. The existence of a deferred state helps preserve as many uncommitted values as possible. For example, if an uncommitted data location is selected for the operand of a complex instruction for which the RCG 20 cannot propagate the uncommitted value, the output value of that instruction must be marked as deferred rather than as uncommitted. However, the input value of that instruction remains uncommitted so that the input value can fulfill a need later in the random program generation process.

When using the RCG 20 to generate a random program, many instructions that may be included in the instruction sequence may have an immediate operand as part of the instruction. This situation may be viewed as an additional operand of the instruction that can remain uncommitted for a time after the instruction is generated by the RCG 20. When the value becomes committed, the an opcode of the instruction maybe modified to integrate the immediate value.

The RCG 20 may also accommodate conditional instructions (i.e., a Boolean condition), such as branching. For example, a conditional instruction: "If r1>r2 then branch," indicates a possible branch. The RCG 20 must know whether the condition (r1>r2) is true when the RCG 20 generates such an instruction so that the RCG 20 can predict the program flow. If r1 or r2 has an uncommitted state, a problem ensues. Committing data locations at this point may be undesirable since the data locations may have good uses in later phases of the random program.

To overcome this problem, the RCG 20 may decide whether the condition is true. The RCG 20 records a decision on the graph 50 corresponding to the branch. Later, when executes ( ) is called for the instruction, the actual condition is checked against the desired outcome. If the actual condition and the desired condition differ, then the instruction opcode may be modified by the execute ( ) subroutine to "flip" the sense of the condition. In the example provided above, if flipping is necessary, the instruction would become: If r1<=r2 then branch.

As the random program becomes longer, the number of processor registers in the uncommitted state decreases. This may eventually limit the length of the random program. In this case, the RCG 20 may set up a large table of uncommitted memory locations, such as in the memory 130. Periodically, the RCG 20 can emit a load instruction to transfer one of the uncommitted values into a randomly selected processor register.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

What is claimed is:

1. A method for generating random programs for use during a design or a verification process to test a processor, the method, comprising:

determining a plurality of data locations, wherein each data location of the plurality of data locations has an unassigned initial content;

assigning an initial content to one or more data locations of the plurality of data locations, the assignment occurring once; and processing a plurality of instructions, one instruction at a time, in a program execution order, until a desired random program length is achieved, wherein the processing provides the one or more of the data locations with current contents, and wherein the processing, comprises:

computing a current content of each of the plurality of data locations, wherein the current content depends on functions of previously processed instructions, and wherein the current content may be unknown when the current content depends on an unassigned initial content of one or more data locations;

generating a random instruction, if a current content of a data location consumed by the random instruction depends on an unassigned initial content of at least one data location, assigning the initial content to the at least one data location that optimizes an effectiveness of the random instruction, and assigning an instruction opcode to an initial content of a pointed to data location.

2. The method of claim 1, wherein the processing further comprises:

if data locations with unassigned initial contents remain when all random instructions are processed, assigning the initial contents of each of the of the remaining data locations to arbitrary numbers.

3. The method of claim 1, wherein one or more instructions include boolean conditions, comprising:

if, when an instruction is generated, one or more data locations that the instruction consumes does not have a known current content, selecting an outcome of the boolean condition; and if the assignment of initial contents to the plurality of data locations during processing of a first instruction or a later instruction causes an outcome of a boolean condition to differ from the selected outcome, then modifying the instruction opcode to specify a complementary boolean condition.

4. The method of claim 1, wherein an instruction contains an immediate operand that is consumed by the instruction.

5. The method of claim 4, further comprising:

inhibiting assignment of an initial random number to the immediate operand when the instruction is generated.

6. The method of claim 1, further comprising:

allocating a memory table in a memory, the memory table comprising a plurality of entries; and generating loads from the memory table to processor registers at random intervals, wherein each entry of the plurality of entries is loaded once.

7. The method of claim 1, wherein the pointed to data location is pointed to by a program counter, the method further comprising advancing the program counter.

8. A method for managing random program generation for use during a design or a verification process to test a processor, wherein initial contents of data locations and results computed by instructions are represented by values, and wherein the random program is executed by processing instructions, the method, comprising:

marking states of the values, wherein the marking, comprises:
- marking a state of a value as uncommitted if the content is unknown and any desired content may be created by assigning a content to one or more other uncommitted values,
- marking a state of a value as deferred if a content is unknown, and it is not possible to compute any desired content by assigning a content to one or more other uncommitted values, and
- marking a value as committed if the content is known;

propagating an uncommitted input value to an uncommitted output value, wherein certain instructions cause the propagation; and converting an uncommitted value to a committed value with a desirable content, comprising:
- locating a predecessor instruction that generated the value to be converted,
- using an inverse function of the predecessor instruction to determine a content for an input uncommitted value of the predecessor instruction consistent with the desirable content for the output uncommitted value, and
- repeating the locating and determining steps until no predecessor instructions remain.

9. The method of claim 8, wherein one or more instructions include boolean conditions, comprising:
- if, when an instruction is generated, one or more data locations that the instruction consumes does not have a known current content, selecting an outcome of the boolean condition; and
- if the assignment of initial contents to the plurality of data locations during processing of a first instruction or a later instruction causes an outcome of a boolean condition to differ from an assumed outcome, then modifying the instruction opcode to specify a complementary boolean condition.

10. The method of claim 8, wherein an instruction contains an immediate operand that is consumed by the instruction.

11. The method of claim 10, further comprising:
inhibiting assignment of an initial random number to the immediate operand when the instruction is generated.

12. The method of claim 8, further comprising:
- allocating a memory table in a memory, the memory table comprising a plurality of entries; and
- generating loads from the memory table to processor registers at random intervals, wherein each entry of the plurality of entries is loaded one.

* * * * *

UNITED STATES PATENT AND TRADEMARK OFFICE
CERTIFICATE OF CORRECTION

PATENT NO. : 6,671,664 B1
DATED : December 30, 2003
INVENTOR(S) : Steven T. Mangelsdorf It is certified that error appears in the above-identified patent and that said Letters Patent is hereby corrected as shown below:

Column 1,
Line 28, delete "modem" and insert therefor -- modern --

Column 3,
Line 42, delete "modem" and insert therefor -- modern --

Column 4,
Line 46, delete "provided" and insert therefor -- provide --

Column 5,
Line 18, after "produce" delete "an"

Column 7,
Line 2, after "250" delete "is"
Line 11, after "illustrating" delete "illustrating"
Line 33, after "committed" delete "the"
Line 50, delete "executes ()" and insert therefor -- execute () --

Column 8,
Line 2, delete "there" and insert therefor -- their --

Column 10,
Line 28, delete "one" and insert therefor -- once --.

Signed and Sealed this

Third Day of May, 2005

JON W. DUDAS
*Director of the United States Patent and Trademark Office*